US010178712B2

(12) United States Patent
Fowkes (10) Patent No.: US 10,178,712 B2
(45) Date of Patent: Jan. 8, 2019

(54) PORTABLE, BATTERY POWERED MICROWAVE FOOD WARMER

(71) Applicant: Doug Fowkes, Springville, UT (US)

(72) Inventor: Doug Fowkes, Springville, UT (US)

(73) Assignee: Infomercials, Inc., Springville, UT (US)

( * ) Notice: Subject to any disclaimer, the term of this patent is extended or adjusted under 35 U.S.C. 154(b) by 224 days.

(21) Appl. No.: 15/251,627

(22) Filed: Aug. 30, 2016

(65) Prior Publication Data

US 2018/0063899 A1 Mar. 1, 2018

(51) Int. Cl.
*H05B 6/64* (2006.01)
*H01M 2/10* (2006.01)
*H01M 10/052* (2010.01)
*H01M 6/14* (2006.01)

(52) U.S. Cl.
CPC ........ *H05B 6/6426* (2013.01); *H01M 2/1027* (2013.01); *H05B 6/6414* (2013.01); *H05B 6/6435* (2013.01); *H01M 6/14* (2013.01); *H01M 10/052* (2013.01); *H01M 2220/30* (2013.01)

(58) Field of Classification Search
CPC .. H05B 6/6402; H05B 6/6414; H05B 6/6426; H05B 6/6435; H05B 6/6464; H05B 6/6467; H05B 6/662; H05B 6/70; H05B 6/72; H05B 6/725; H01M 10/0525; H01M 10/06; H01M 2/1022; H01M 2220/30; H01M 2/1027; H01M 10/052; H01M 6/14
USPC ....... 219/717, 715, 722, 724, 725, 732, 739, 219/755, 756, 762
See application file for complete search history.

(56) References Cited

U.S. PATENT DOCUMENTS

| | | |
|---|---|---|
| D245,162 S | 7/1977 | Zimmer |
| 5,369,255 A | 11/1994 | Sherer et al. |
| D371,038 S | 6/1996 | Hsu |
| D375,651 S | 11/1996 | Su |
| 5,632,921 A | 5/1997 | Risman et al. |
| D380,339 S | 7/1997 | Hsu |
| D384,240 S | 9/1997 | Wang |
| D393,178 S | 4/1998 | Su |
| 5,841,113 A * | 11/1998 | Kim ............... H05B 6/6414 219/739 |
| 6,013,910 A | 1/2000 | Ferraro et al. |
| D449,761 S | 10/2001 | Loftis et al. |
| 6,693,267 B2 | 2/2004 | Shimizu et al. |
| D487,666 S | 3/2004 | Monguilod |
| D523,282 S | 6/2006 | Yoon |
| D613,991 S | 4/2010 | Baek |
| D614,437 S | 4/2010 | Baek |

(Continued)

OTHER PUBLICATIONS

Heinz Beanzawave—a small microwave apparently powered from a USB port (http://www.beanzawave.co.uk/). As accessed on this date: Jul. 28, 2016. p. 1.

(Continued)

*Primary Examiner* — Hung D Nguyen
(74) *Attorney, Agent, or Firm* — Thorpe, North & Western, LLP (57) ABSTRACT

A portable, cordless, battery powered microwave food warmer is sized and powered to be portable. The food warmer has feet on the bottom and the back to accommodate both upright and laid-back orientations. The food warmer can have a pair of battery power packs that match a housing of the food warmer.

18 Claims, 7 Drawing Sheets

(56) References Cited

U.S. PATENT DOCUMENTS

| | | | |
|---|---|---|---|
| D615,806 S | 5/2010 | Baek | |
| 7,829,827 B2 | 11/2010 | Rosenbloom et al. | |
| 8,405,010 B2 | 3/2013 | Van Dyke et al. | |
| 9,307,862 B2 | 4/2016 | Roever et al. | |
| 2008/0190914 A1 | 8/2008 | Gibson | |
| 2008/0217327 A1 | 9/2008 | Herrera | |
| 2008/0228248 A1* | 9/2008 | Guyuron | A61F 7/02 607/108 |
| 2013/0186888 A1* | 7/2013 | Connors | H05B 6/6402 219/756 |

OTHER PUBLICATIONS

Power Hunt—a portable microwave oven powered directly from a car battery (http://www.power-hunt.com/12-volt-microwave.php) As accessed on this date: Jul. 28, 2016. p. 1.

\* cited by examiner

PORTABLE, BATTERY POWERED MICROWAVE FOOD WARMER

BACKGROUND

Field of the Invention

The present invention relates generally to a portable, cordless, battery powered microwave food warmer.

Related Art

Eating while traveling or working often means eating cold food. In some instances, access to a kitchen is sometimes not possible. Microwave ovens have been developed, but are often permanently mounted in kitchens and too large to carry. Smaller food warmers have been proposed, but still require a power cord to plug into a separate power supply. For example, see the Beansawave desktop food warmer by Heinz with an unknown heating method and a USB power cord; or the Wavebox microwave oven with a special power cord to couple to a car battery.

SUMMARY OF THE INVENTION

It has been recognized that it would be advantageous to develop a small, portable, cordless, battery-powered microwave even to warm food while traveling or at work.

The invention provides a portable, microwave food warmer having a housing with a chamber therein configured to receive food. The housing has a door openable to the chamber. A magnetron is disposed in the housing to generate short radio waves into the chamber to warm the food. Rechargeable lithium batteries are disposed in the housing to power the magnetron.

In accordance with a more detailed aspect of the invention, the microwave food warmer can be sized and configured to facilitate portability. The housing can have a width less than 7 inches, a depth less than 7.5 inches, and a height less than 12 inches, in an upright orientation. The chamber can have a width less than 5 inches, a depth less than 4 inches, and a height less than 8 inches, in the upright orientation. The chamber can have a volume less than 100 cubic inches.

In accordance with another more detailed aspect of the invention, the microwave food warmer can have multiple orientations to facilitate different sized food containers in the compact size. The housing can have a bottom wall with bottom feet, and a back wall opposite the door and/or front with back feet. The bottom and back walls can be contiguous and perpendicular to one another. The bottom and back feet can be separately and selectively disposed upon a support surface. In addition the chamber can have a bottom and a back that are contiguous and perpendicular to one another, and that correspond to the bottom wall and the back wall of the housing, respectively. The chamber can have an elongated shape with the bottom being smaller than the back. The housing has two configurations, including: 1) an upright orientation with the bottom feet disposed on the support surface and the door opening horizontally, and with the bottom of the chamber oriented horizontally to receive a narrower and taller container: and 2) a laid-back orientation with the back feet disposed on the support surface and the door opening vertically, and with the back of the chamber oriented horizontally to receive a longer and shorter container. The magnetron can be disposed above the chamber, and the batteries can be disposed below the chamber, in the upright orientation. In addition, the housing can have a base with the batteries, and a main housing with the chamber therein. The base and the main housing can have the same perimeter size and shape with a perimeter surface of the base being contiguous with a perimeter surface of the main housing.

In accordance with another more detailed aspect of the invention, the microwave food warmer can be further configured to facilitate portability by having a pair of power packs separately and selectively coupled to the housing. Each power pack can have the same perimeter size and shape as the housing. Each power pack can have a perimeter surface being contiguous with a perimeter surface of the housing. Each power pack can contain rechargeable lithium batteries capable of powering the magnetron.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "food" is used broadly herein to refer to an edible item, including a beverage any container in which the food or beverage is contained.

The term "support surface" is used broadly herein to refer to a surface upon which the microwave food warmer is disposed, and can include by way of example, a counter top, a desk top, a shelf, a table, the ground, etc. The support surface can be oriented horizontally.

The terms "battery" and "batteries" are used interchangeably herein. A battery can comprise multiple batteries coupled together.

Description

The microwave food warmer of the present invention is battery powered and small, and thus capable of being transported or carried while traveling. In one aspect, the microwave food warmer can be less than 7×7.5×12 inches. In one aspect, the microwave food warmer can have lithium ion batteries capable of powering a magnetron in the microwave food warmer for at least six minutes. In one aspect, the magnetron can have a power output of greater than 400 Watts. Thus, the microwave food warmer can be easily carried, and capable of warming a typical meal for a single person (or single serving), or even two people (or double serving). In addition, the microwave food warmer can have multiple orientations, such as an upright orientation and a lunch box orientation. Furthermore, the microwave food warmer can be provided with a removable battery pack that can be removed for charging, and replaced with a charged battery pack. Thus, multiple battery packs corresponding to multiple means or servings. The battery packs can form part of the housing of the microwave food warmer, and can accommodate the multiple orientations of the microwave food warmer.

As illustrated in FIGS. 1-13, a portable, cordless, battery-powered microwave food warmer device, indicated generally at 10, in an example implementation in accordance with the invention is shown. The microwave food warmer 10 has a housing 14 with a chamber 18 therein to receive food to be warmed. The housing 10 also has a door 22 openable to the chamber 18, and defining a front of the housing. The door can be pivotally coupled to the housing, and can have a latch 26 carried by the door. A hook 30 can protrude from the latch to engage the housing to selectively lock the door in the closed position. Pressing the latch can pivot the hook to disengage from the housing and allow the door to open. In one aspect, the door can be arcuate to match an arcuate shape of a cup or bowl that can be placed in the chamber. The arcuate shape of the door can provide a partial cylindrical shape to the chamber, and can minimize the overall size of the housing and the microwave food warmer.

Figure 5:
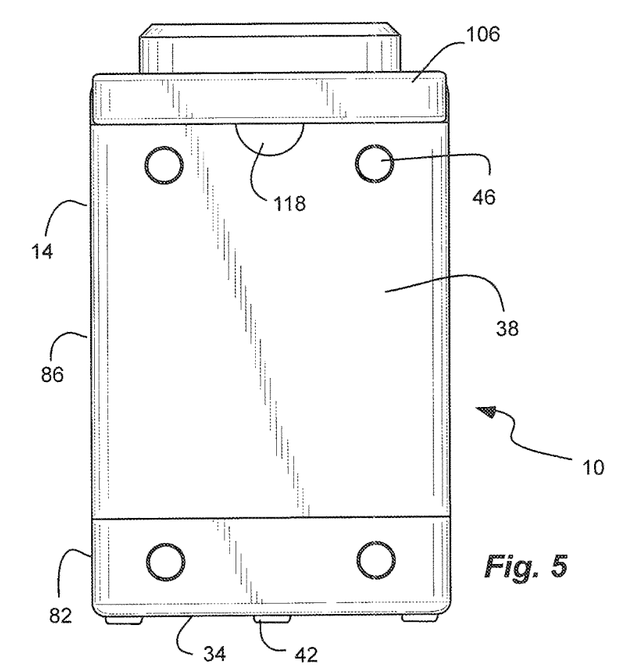
FIG. 5 is a rear view of the microwave food warmer of FIG. 1.

The housing 14 has a bottom wall 34 (FIG. 8) and a back wall 38 (FIG. 5) opposite the front of the housing, or opposite the door 22. The bottom and back walls 34 and 38 are contiguous to one another, and are oriented perpendicularly with respect to one another. The bottom wall 34 has bottom feet 42 (FIG. 8), while the back wall 38 has back feet 46 (FIG. 5). The feet 42 and 46 protrude from the v and can be formed of a different material than the walls (such as rubber or the like) to provide a non-slip, high friction surface. The microwave food warmer 12 and/or housing 14 has multiple orientations, with the bottom and back feet 42 and 46 being separately and selectively disposed upon a support surface 50 in the multiple orientations, as discussed below.

The chamber 18 has a bottom 54 and a back 58 that are contiguous to one another, and that are oriented perpendicular to one another. The bottom and back 54 and 58 of the chamber 18 correspond to the bottom and back walls 34 and 38 of the housing 14, respectively. The chamber 18 can have an elongated, rectangular shape with the bottom 54 being smaller than the back 58. Food can be placed on either the bottom 54 or the back 58 of the chamber 18 depending on the orientation of the microwave food warmer or housing. In one aspect, the chamber 18 can have a volume less than 100 cubic inches. For example, the chamber 18 can have a width less than 5 inches, a depth less than 4 inches, and a height less than 8 inches, in the upright orientation. Thus, the chamber is sized for single servings, and to be portable.

Figure 6:
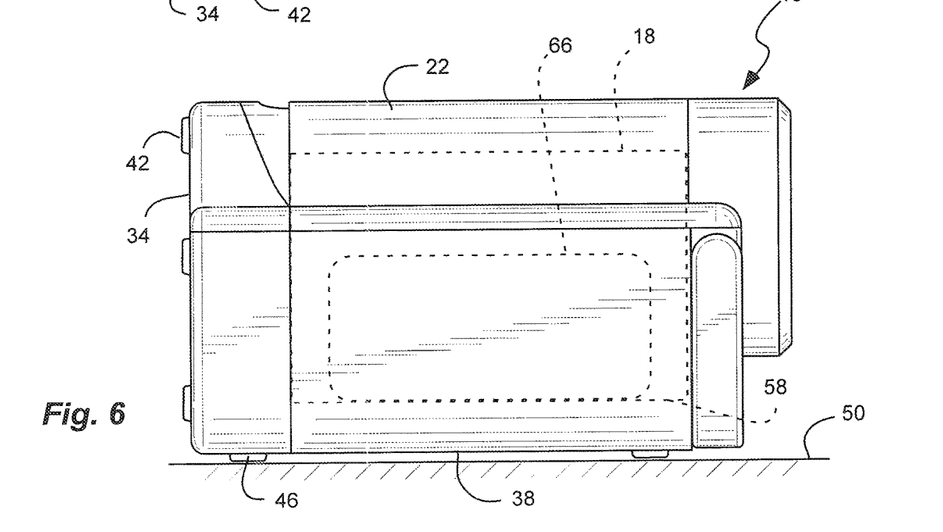
FIG. 6 is a side view of the microwave food warmer of FIG. 1, and showing the microwave food warmer and housing a laid-back position, and showing a longer and shorter container in the chamber of the housing.
Figure 7:
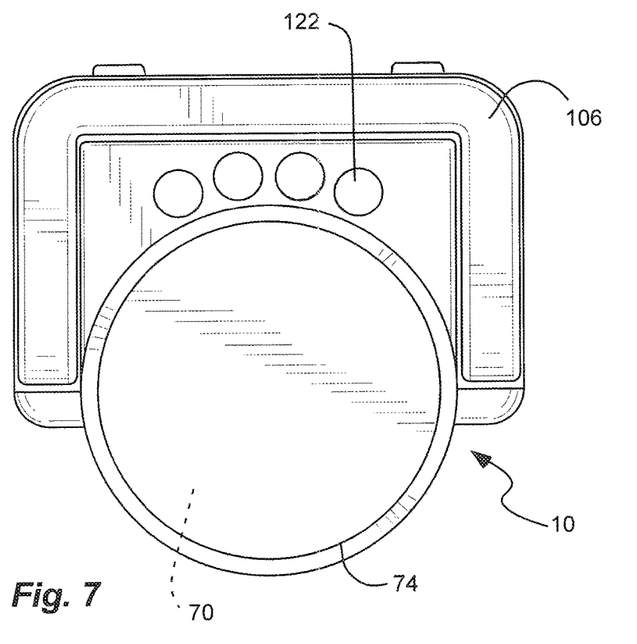
FIG. 7 is a top view of the microwave food warmer of FIG. 1.
Figure 8:
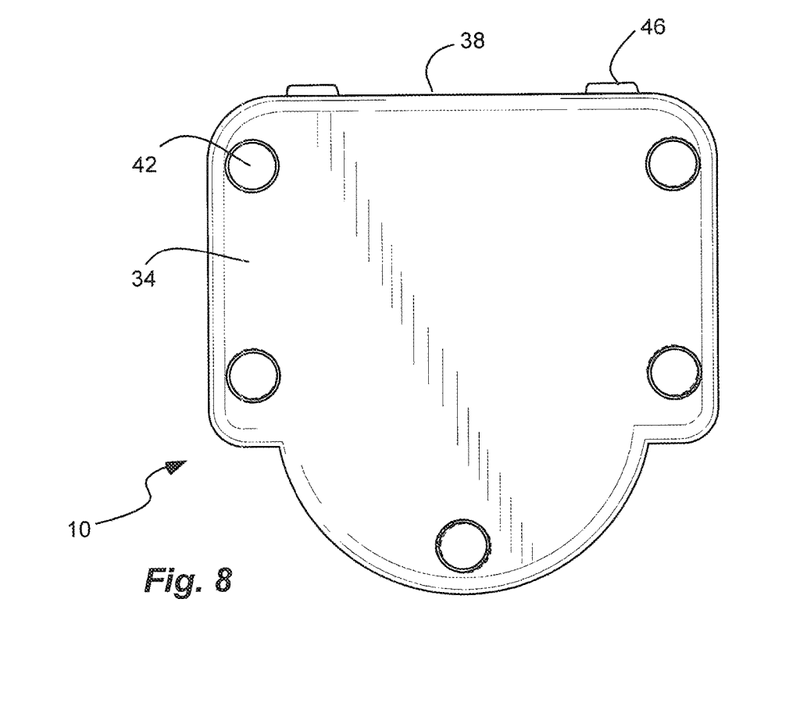
FIG. 8 is a bottom view of the microwave food warmer of FIG. 1.

As stated above, the microwave food warmer 10 and/or the housing 14 can have two configurations or orientations, including: 1) an upright orientation (as shown in FIGS. 1-5); and 2) a laid back or lunch box orientation (as shown in FIG. 6). In the upright orientation (FIG. 3), the bottom feet 42 are disposed on the support surface 50, and the door 22 opens horizontally (FIGS. 2, 11 and 12): and the bottom 54 of the chamber 18 is oriented horizontally to receive a narrower and latter container 62 (FIG. 4), such as a cup. In the laid-back orientation (FIG. 6), the back feet 46 are disposed on the support surface 50, and the door 22 opens vertically (FIG. 13); and the back 58 of the chamber 18 is oriented horizontally to receive a longer and shorter container 66 (FIG. 6), such as a food container. Thus, the multiple orientations of the microwave food warmer or housing allow different foods or containers to be accommodated, despite the small size of the chamber.

Figures 1, 2:
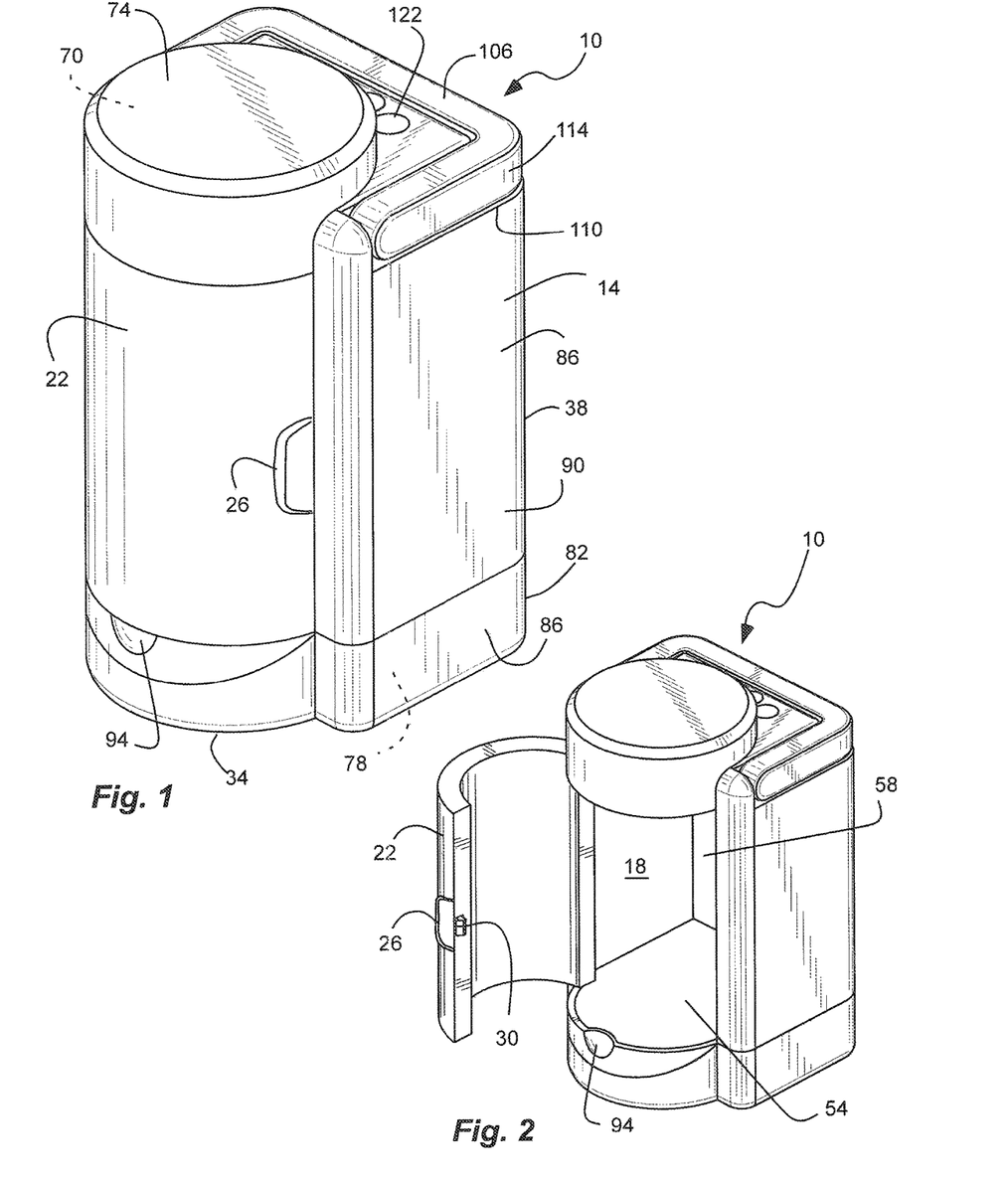
FIG. 1 is a perspective view of a microwave food warmer in accordance with an embodiment of the present invention, showing a door in a closed position, and a handle in a storage orientation, and showing the microwave food warmer and a housing in an upright orientation.
FIG. 2 is a perspective view of the microwave food warmer of FIG. 1, showing the door in an open position.
Figures 3, 4:
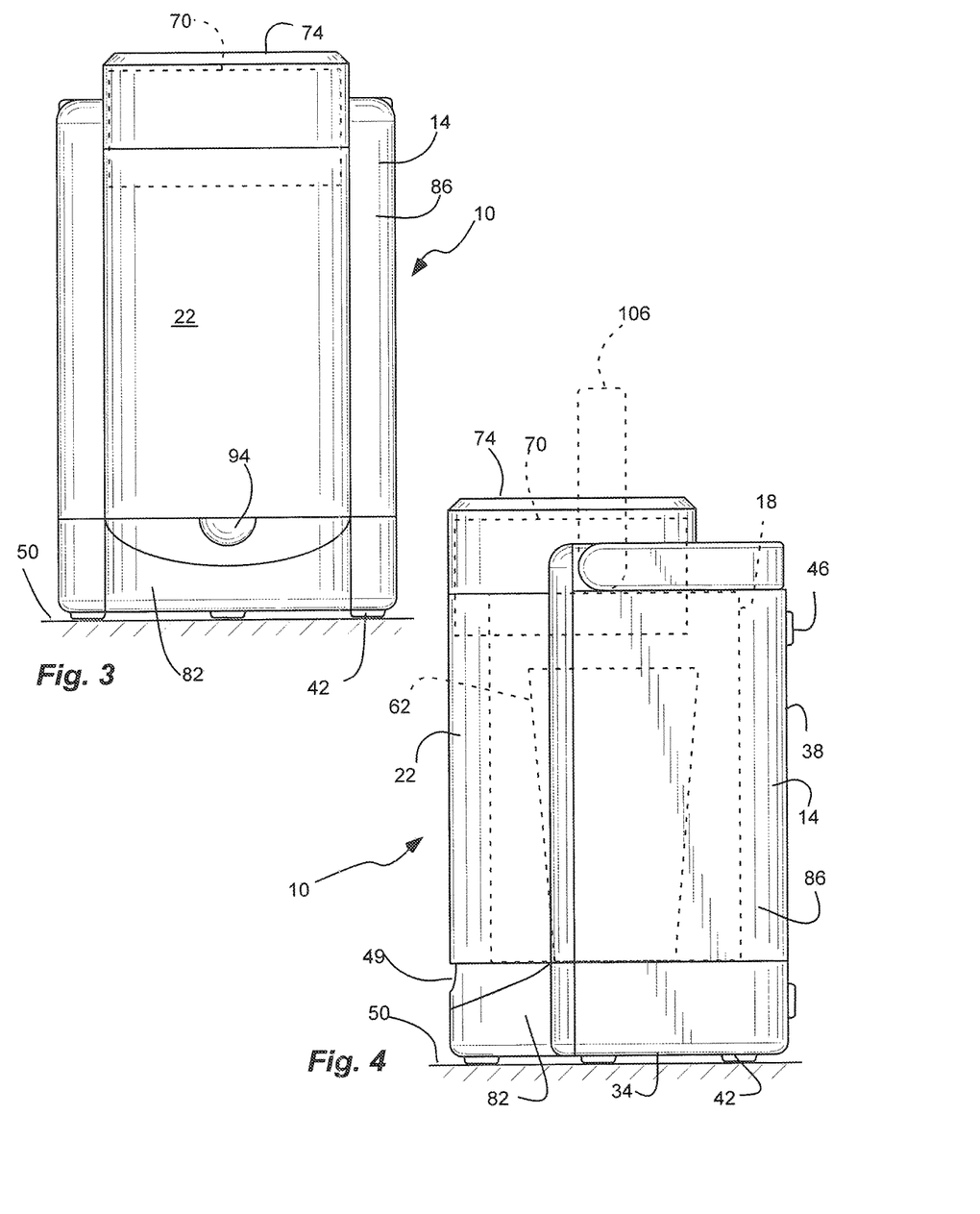
FIG. 3 is a front view of the microwave food warmer of FIG. 1.
FIG. 4 is a side view of the microwave food warmer of FIG. 1, and showing the handle in a carry orientation in dashed lines, and showing a narrower and taller container in a chamber of the housing.

The food is warmed by a magnetron 70 (FIG. 3) disposed in the housing 14. In one aspect, the magnetron 70 can be disposed above the chamber 18 when the housing is in the upright orientation. In one aspect, the housing 14 can have a protrusion 74 extending from a top of the housing (in the upright orientation), and the protrusion 74 can accommodate at least a portion of the magnetron 70 therein, as shown in FIG. 3. In another aspect, the magnetron 74 can extend into the chamber 18, as shown in FIG. 4. Thus, the housing can be configured and the magnetron can be located to accommodate a small size of the microwave food warmer. The magnetron 70 can be of microwave type and can generate short radio waves into the chamber, such as short-wavelength radio waves with a wave frequency of approximately 2,450 megahertz (2.45 gigahertz). In one aspect, the magnetron 70 can have a power output of greater than 400 Watts (in the compact size of 7×7.5×12 inches). The magnetron 70 can be powered by rechargeable lithium batteries 78 disposed in the housing (or base thereof). In one aspect, the batteries 78 can be disposed below the chamber 18 when the housing is in the upright orientation. The batteries can be electrically coupled to the magnetron. In one aspect, the batteries can be greater than 33 amps at 12 volts, or greater than 16 amps at 24 volts. In another aspect, the rechargeable lithium batteries can be capable of operating the magnetron for at least 6 minutes in one aspect, and for at least 4 minutes in another aspect. Thus, the microwave food warmer can operate 6 times for 1 minute, 3 times for 2 minutes, and two times for 3 minutes.

The microwave food warmer 10 and/or the housing 14 can be small, and can have a width less than 7 inches, a depth less than 7.5 inches, and a height less than 12 inches, in the upright orientation. The housing 14 can be formed of plastic, and can be formed by injection molding. In addition, the housing can comprise several pieces joined together. The chamber can be surrounded by metal walls to reflect microwaves from the magnetron, and maintain the microwaves in the chamber. In one aspect, the housing 14 can have a base 82 with the batteries 78 therein, and a main housing 86 which contains the chamber 18 therein. The door can form part of the housing and main housing. In one aspect, the base 82 and the main housing 86 can have the same perimeter size and shape, with a perimeter surface 86 of the base 82 being contiguous with a perimeter surface 90 of the main housing 86. The perimeter surfaces 86 and 90 of the base 82 and main housing 86 (and door 22) can be parallel and coplanar around substantially their entire perimeters (except for a finger notch described below). Thus, the perimeters of the base and the main housing can border one another and can be flush with one another or can match one another around substantially the entire perimeters. Thus, the housing resists accumulation of debris, or food waste, between the base and the housing (particularly when separated, as discussed below). A finger notch 94 can be disposed in the housing 14 below the door 22 (in the upright orientation of the housing). The finger notch 94 can extend into the base 82 so that the door 22 overlaps the finger notch. The finger notch can facilitate opening the door.

The base 82 can define a power or battery pack, and can be removeably coupled to the main housing 86. The microwave food warmer can include multiple bases or battery packs, such as a pair of bases or battery packs, separately and selectively coupleable to the main housing. The base 82 can be a primary base and the lithium batteries 78 can be primary lithium batteries. The microwave food warmer or housing can have a secondary base 98 (FIG. 9) that also has the same perimeter size and shape as the main housing 86, with a perimeter surface of the secondary base being contiguous with the perimeter surface of the main housing. Secondary rechargeable lithium batteries 102 (FIG. 9) can be disposed in the secondary base 98. The secondary base 98 with the secondary lithium batteries 102 can be interchangeable with the primary base 82 with the primary lithium batteries 78. The secondary base and batteries can define a second power or battery pack. Thus, a user can have multiple power packs. When the batteries in one power pack are exhausted, the power pack can be quickly and easily exchanged for another battery pack. The bases can be removable and can contain the batteries housed therein. When batteries in one base are exhausted, the base can be removed from the main housing, and anther base with charged batteries can be coupled to the main housing.

Figures 9, 10:
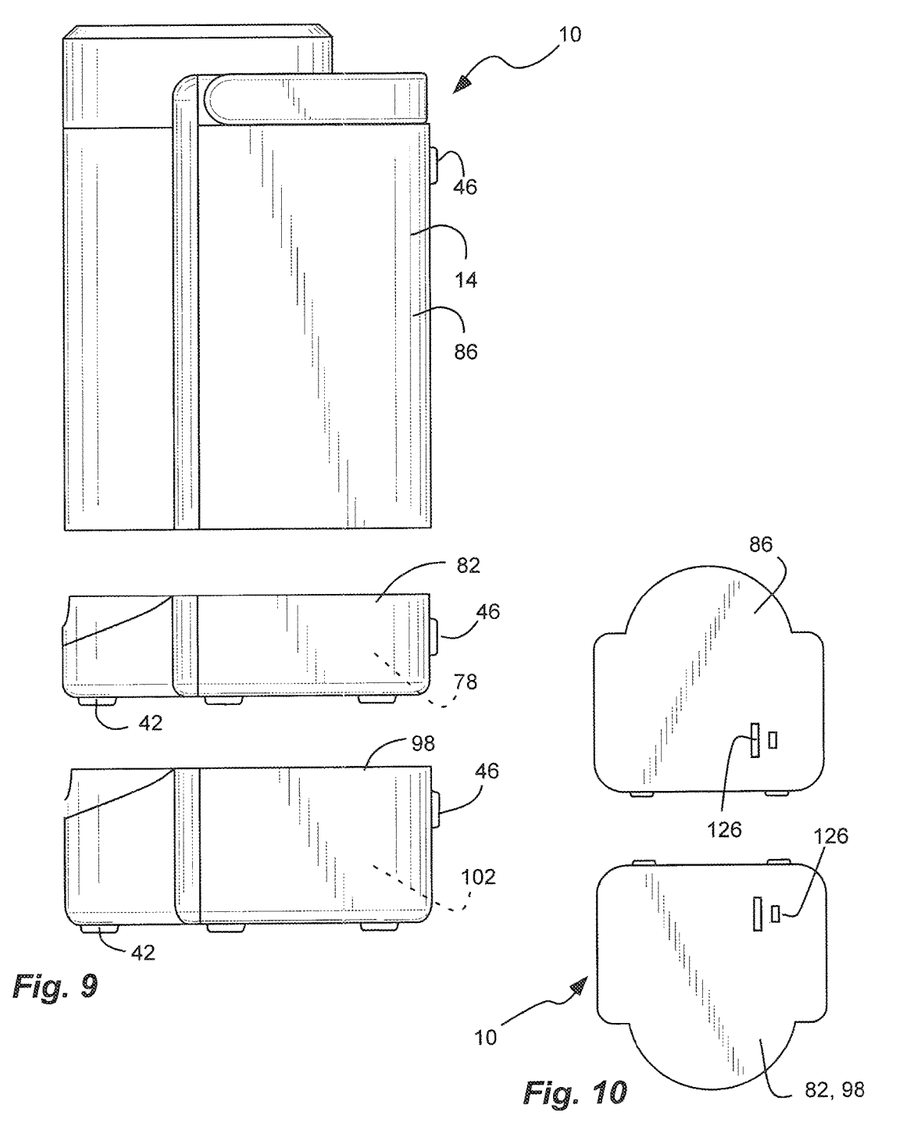
FIG. 9 is an exploded side, view of the microwave food warmer of FIG. 1, showing a pair of power packs selectively coupleable to a main housing of the microwave food warmer.
FIG. 10 is an exploded view of the microwave food warmer of FIG. 1, showing a top of a base or power pack and a bottom of the main housing.
Figure 11:
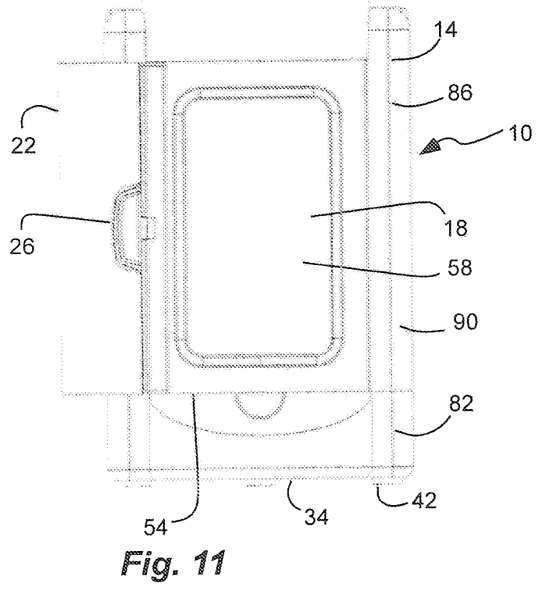
FIG. 11 is a front view of the microwave food warmer of FIG. 1, showing the door in the open position.
Figure 12:
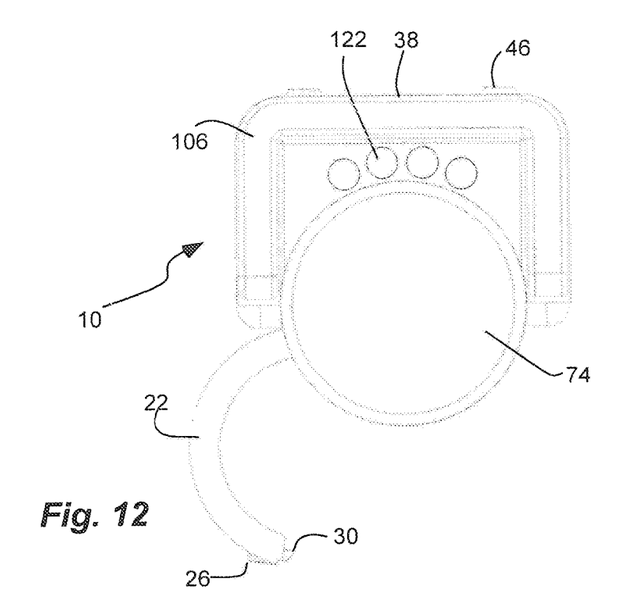
FIG. 12 is a top view of the microwave food warmer of FIG. 1, showing the door in the open position.
Figure 13:
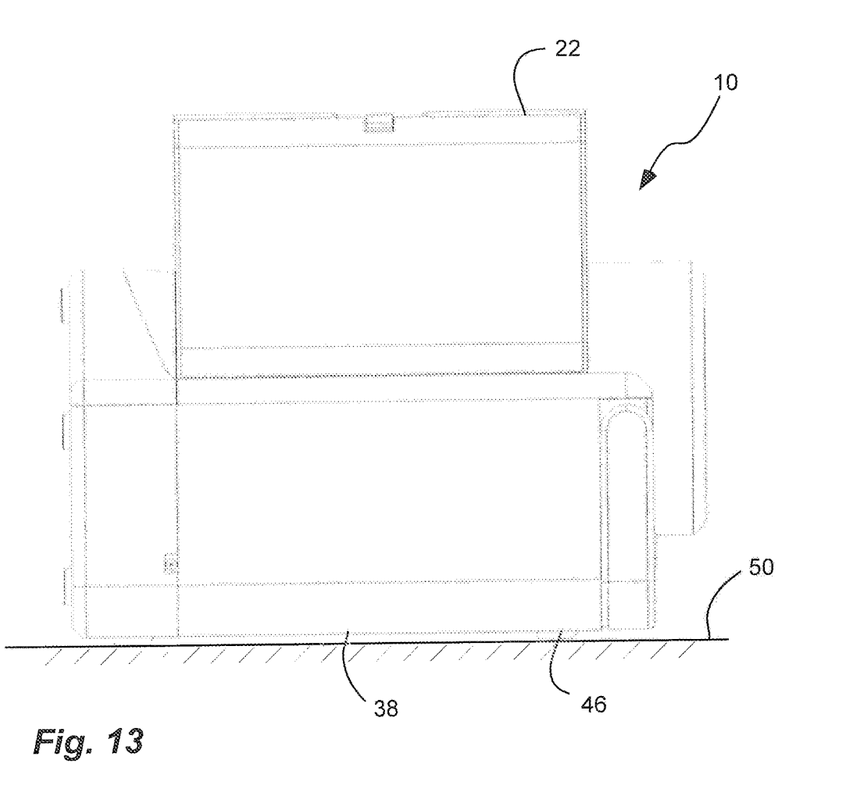
FIG. 13 is a side view of the microwave food warmer of FIG. 1, showing the door in the open position.

In one aspect, the secondary lithium batteries 102 can have a different size than the primary lithium batteries 78, and the secondary base 98 can have a greater height than the primary base 82. Thus, the primary and secondary bases can provide different power options for the magnetron. In another aspect, the primary and secondary bases, and batteries, can be identical. Thus, one battery can be used to power the magnetron while the other battery is charging. The housing or the base can include a power port to receive a charging cord to charge the batteries. Thus, the microwave food warmer 10, can have multiple (such as a pair) of power packs separately and selectively coupleable to the housing or main housing, as shown in FIG. 9. Each power pack can have the same perimeter size and shape as the housing. And each power pack can have a perimeter surface being contiguous with a perimeter surface of the housing. And each power pack can contain rechargeable lithium batteries capable of powering the magnetron. The pair of power packs can have different heights to accommodate different lithium batteries that have different sizes.

The bases 82 and 98 or the power packs can form or have the bottom 34 of the housing 14, and can carry the bottom feet 42 of the housing. In addition, the bases 82 and 98 or the power packs can form a portion of the back wall 38, and can carry some of the back feet 46. Thus, the matching perimeter surfaces of the bases and the main housing and the matching perimeter size and shape of the bases and the main housing facilitates disposing the back feet 46 on the support surface 50 in the laid-back orientation.

In addition, the microwave microwave food warmer 10 can have a handle 106 to facilitate transporting and carrying the microwave food warmer. The handle 106 can be extendable for carrying and retractable when food is being warmed. The housing 14 or the main housing 86 can have a handle recess 110 formed in a top of the housing. The recess can be a partial channel extending around a portion of the perimeter of the housing and being open upward, and outward (when the housing is in the upright orientation). The handle 106 can be pivotally coupled to the housing 14 or 86, and can be pivotal between: 1) a storage orientation (FIGS. 1-7); and 2) a carrying orientation (shown in dashed lines in FIG. 4). In the storage orientation, the handle 106 is oriented horizontally (in the upright orientation of the housing), and is received within the handle recess 110 of the housing. In addition, a lateral exterior 114 of the handle 106 is substantially flush with the perimeter surface 90 of the housing. In the carrying orientation, the handle 106 is oriented vertically (in the upright orientation of the housing), and extends from the housing. In addition, the housing or main housing can have a finger notch 118 (FIG. 5) extending into the housing and located below the handle 106 in the storage orientation. The linger notch 118 can extend into the housing so that the handle 106 overlaps the finger notch in the storage orientation.

In addition, the microwave food warmer 10 and/or housing 14 or main housing 86 can have buttons 122 to operate the microwave food warmer and/or the magnetron. The buttons can be coupled to control electronics in the housing. In one aspect, the buttons 122 can be disposed in a top of the housing (in the upright orientation). In another aspect, the button 122 can be located between the magnetron 70 and the handle 106 in the storage orientation, as shown in FIG. 6. Thus, the buttons are located below the magnetron or protrusion 74 in the housing to avoid inadvertent activation. In one aspect, the buttons can correspond to predetermined time periods of operation of the magnetron, such as 1 minute, 2 minutes and 3 minutes. In addition, one of the buttons can be an off button. The microwave food warmer can operate 6 times for 1 minute, 3 times for 2 minutes, and two times for 3 minutes.

In addition, an electrical connection 126 can be disposed between the main housing 86 and the base 83 and/or 98, as shown in FIG. 10, to electrically couple the batteries in the base to the magnetron in the math housing.

A method for using the microwave food warmer 10 described above, and for portably and cordlessly warming food, includes: charging the lithium batteries 78 and/or 102; transporting the microwave food warmer 10 and/or housing 14 to a desired location; placing a food item 62 and/or 66 in the chamber 18; and operating the magnetron 70 under power from the lithium batteries, such as by pushing one of the buttons 122. In addition, the method can include selectively orienting the microwave food warmer 10 and/or housing 14 in the upright or laid-back orientation, and disposing the microwave food warmer and/or housing on the support surface 50 with the housing resting on the bottom or back feet 42 or 46; and opening the door 22 either horizontally or vertically. Furthermore, the method can include selecting one of the power packs 82 or 98 and attaching the power pack to the main body. In addition, the method can include charging one or both of the power packs.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A portable, microwave food warmer device, comprising:
   a) a housing with a chamber therein configured to receive food, the housing having a door openable to the chamber and defining a front of the housing, the housing having a bottom wall with bottom feet and a back wall opposite the front with back feet, the bottom and back walls being contiguous and perpendicular to one another, the bottom and back feet being configured to be separately and selectively disposed upon a support surface;
   b) the chamber having a bottom and a back that are contiguous and perpendicular to one another, and that correspond to the bottom wall and the back wall of the housing, respectively;
   c) the chamber having an elongated shape with the bottom being smaller than the back;
   d) the housing having two configurations, including:
      i) an upright orientation with the bottom feet disposed on the support surface and the door opening horizontally, and with the bottom of the chamber oriented horizontally to receive a narrower and taller container; and
      ii) a laid-back orientation with the back feet disposed on the support surface and the door opening vertically, and with the back of the chamber oriented horizontally to receive a longer and shorter container;
   e) a magnetron disposed in the housing and above the chamber in the upright orientation, the magnetron configured to generate short radio waves into the chamber;
   f) the housing having a main housing with the chamber therein and a pair of bases, including primary and secondary bases, separately and selectively couplable to the housing, the pair of bases and the main housing having the same perimeter size and shape with a perimeter surface of the base being contiguous with a perimeter surface of the main housing;
   g) primary and secondary rechargeable lithium batteries disposed in the primary and secondary bases, respectively, of the housing and below the chamber in the upright orientation and coupled to the magnetron; and
   h) the secondary base with the secondary lithium batteries being interchangeable with the primary base with the primary lithium batteries.

2. The device in accordance with claim 1, wherein the rechargeable lithium batteries are capable of operating the magnetron for at least 6 minutes.

3. The device in accordance with claim 1, further comprising:
   a finger notch below the door in the upright orientation, the finger notch extending into the base so that the door overlaps the finger notch.

4. The device in accordance with claim 1, further comprising:
   a) a handle recess formed in a top of the housing;
   b) a handle pivotally coupled to the housing and pivotal between:
      i) a storage orientation in which the handle is oriented horizontally in the upright orientation of the housing and received within the handle recess of the housing, and with a lateral exterior of the handle being substantially flush with the perimeter surface of the housing; and
      ii) a carrying orientation in which the handle is oriented vertically in the upright orientation of the housing and extends from the housing;
   c) a finger notch below the handle in the storage orientation, the finger notch extending into the housing so that the handle overlaps the finger notch.

5. The device in accordance with claim 4, further comprising:
   buttons disposed in a top of the housing in the upright orientation and located between the magnetron and the handle in the storage orientation.

6. The device in accordance with claim 1, wherein the housing has a protrusion extending from a top of the housing in the upright orientation, and wherein the protrusion accommodates at least a portion of the magnetron therein.

7. The device in accordance with claim 1, wherein the magnetron extends into the chamber.

8. The device in accordance with claim 1, further comprising:
   a latch carried by the door with a hook protruding therefrom to engage the housing.

9. The device in accordance with claim 1, wherein the secondary lithium batteries have a different size than the primary lithium batteries; and wherein the secondary base has a greater height than the primary base.

10. The device in accordance with claim 1, wherein the housing has a width less than 7 inches, a depth less than 7.5 inches, and a height less than 12 inches, in the upright orientation; and wherein the magnetron has a power output of greater than 400 Watts.

11. The device in accordance with claim 1, wherein the chamber has a volume less than 100 cubic inches.

12. The device in accordance with claim 1, wherein the chamber has a width less than 5 inches, a depth less than 4 inches, and a height less than 8 inches, in the upright orientation.

13. A method for portably and cordlessly warming food using the device, comprising:
   A) a housing with a chamber therein configured to receive food, the housing having a door openable to the chamber and defining a front of the housing, the housing having a bottom wall with bottom feet and a back wall opposite the front with back feet, the bottom and back walls being contiguous and perpendicular to one another, the bottom and back feet being configured to be separately and selectively disposed upon a support surface;
   B) the chamber having a bottom and a back that are contiguous and perpendicular to one another, and that correspond to the bottom wall and the back wall of the housing, respectively;

C) the chamber having an elongated shape with the bottom being smaller than the back;

D) the housing having two configurations, including:

i) an upright orientation with the bottom feet disposed on the support surface and the door opening horizontally, and with the bottom of the chamber oriented horizontally to receive a narrower and taller container; and ii) a laid-back orientation with the back feet disposed on the support surface and the door opening vertically, and with the back of the chamber oriented horizontally to receive a longer and shorter container;

E) a magnetron disposed in the housing and above the chamber in the upright orientation, the magnetron configured to generate short radio waves into the chamber;

F) the housing having a main housing with the chamber therein and a pair of bases, including primary and secondary bases, separately and selectively couplable to the housing, the pair of bases and the main housing having the same perimeter size and shape with a perimeter surface of the base being contiguous with a perimeter surface of the main housing; and G) primary and secondary rechargeable lithium batteries disposed in the primary and secondary bases, respectively, of the housing and below the chamber in the upright orientation and coupled to the magnetron: and H) the secondary base with the secondary lithium batteries being interchangeable with the primary base with the primary lithium batteries, the method comprising:

a) charging the lithium batteries;

b) transporting the housing to a desired location;

c) placing a food item in the chamber; and d) operating the magnetron under power from the lithium batteries.

14. A portable, microwave food warmer device, comprising:

a) a housing with a chamber therein configured to receive food, the housing having a door openable to the chamber;

b) a magnetron disposed in the housing;

c) a pair of power packs separately and selectively couplable to the housing, each power pack having the same perimeter size and shape as the housing, each power pack having a perimeter surface being contiguous with a perimeter surface of the housing; and d) each power pack containing rechargeable lithium batteries capable of powering the magnetron.

15. The device in accordance with claim 14, wherein the pair of power packs have different heights with lithium batteries that have different sizes.

16. The device in accordance with claim 14, wherein the door defines a front of the housing, and wherein the housing has a back wall opposite the front with back feet, and wherein each of the battery packs has a bottom wall with bottom feet, the back wall of the housing and the bottom wall of the battery pack being perpendicular to one another, the bottom and back feet being configured to be separately and selectively disposed upon a support surface, and wherein the chamber has a bottom and a back that are contiguous and perpendicular to one another, and wherein the housing and an attached battery pack have two configurations, including: i) an upright orientation with the bottom feet disposed on a support surface and the door opening horizontally, and with the bottom of the chamber oriented horizontally to receive a narrower and taller container; and ii) a laid-back orientation with the back feet disposed on the support surface and the door opening vertically, and with the back of the chamber oriented horizontally to receive a longer and shorter container.

17. The device in accordance with claim 16, wherein each of the battery packs also has a back wall with back feet.

18. The device in accordance with claim 14, wherein the magnetron has a power output of greater than 400 Watts; and wherein the housing has a width less than 7 inches, a depth less than 7.5 inches, and a height less than 12 inches.

* * * * *